(12) United States Patent
Algüera Gallego et al.

(10) Patent No.: US 8,382,145 B2
(45) Date of Patent: Feb. 26, 2013

(54) AUTOMATIC BRAKE

(75) Inventors: José Manuel Algüera Gallego, Aschaffenburg (DE); Michael Eiermann, Pfungstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 53 days.

(21) Appl. No.: 12/737,382

(22) PCT Filed: Jul. 10, 2009

(86) PCT No.: PCT/EP2009/058872
§ 371 (c)(1),
(2), (4) Date: Jan. 31, 2011

(87) PCT Pub. No.: WO2010/004048
PCT Pub. Date: Jan. 14, 2010

(65) Prior Publication Data
US 2011/0127749 A1 Jun. 2, 2011

(30) Foreign Application Priority Data

Jul. 10, 2008 (DE) .......................... 10 2008 040 337

(51) Int. Cl.
*B60T 13/38* (2006.01)
(52) U.S. Cl. ............. 280/421; 280/504; 701/70; 303/71
(58) Field of Classification Search .................. 280/421, 280/504; 303/71; 701/70
See application file for complete search history.

(56) References Cited

U.S. PATENT DOCUMENTS

| 6,450,587 | B1 | 9/2002 | MacGregor et al. |
| 7,104,614 | B2 * | 9/2006 | Heuer et al. ................... 303/140 |
| 2008/0129010 | A1 * | 6/2008 | Alguera ........................ 280/420 |

FOREIGN PATENT DOCUMENTS

| DE | 101 59 503 | A1 | | 6/2003 |
| DE | 10159503 | A1 | * | 6/2003 |
| DE | 10 2004 047 492 | A1 | | 4/2006 |
| GB | 2 417 764 | A | | 3/2006 |
| WO | WO 01/44030 | A2 | | 6/2001 |

* cited by examiner

*Primary Examiner* — Tony H. Winner
*Assistant Examiner* — Jacob Knutson
(74) *Attorney, Agent, or Firm* — Hudak, Shunk & Farine Co. LPA

(57) ABSTRACT

A system for braking a trailer being coupled to a pulling vehicle by means of a coupling device, comprising a supply circuit on the pulling vehicle side, and a brake circuit on the trailer side, wherein the brake circuit is removably attached to the supply circuit by means of at least one plug-in coupling. The invention is based on the object of providing a system for braking a trailer, wherein the risk of an uncontrolled vehicle movement, at least of the trailer vehicle, is reduced. The problem is solved according to the invention by means of a system wherein disposed within the brake circuit is a ventilation valve that can be remotely controlled by the pulling vehicle.

20 Claims, 1 Drawing Sheet

AUTOMATIC BRAKE

FIELD OF THE INVENTION

The invention relates to a braking system for a trailer (e.g. semi-trailer) coupled to a pulling vehicle (tractor), comprised of a supply circuit on the tractor side and a brake circuit on the trailer side, wherein the brake circuit is removably coupled to the supply circuit by means of at least one plug-in coupling.

BACKGROUND OF THE INVENTION

Such a system is described in, e.g., DE 10 2004 047492 A1. The known publication also discloses an automatic plug coupling system in the region of a "fifth wheel" semi-trailer coupling, which automatic plug coupling system is intended to replace the customary manually manipulated plug couplings.

DE 101 59503 A1 describes a monitoring and control device for a tractor and semi-trailer combination, wherein the tractor has a remotely controllable fifth wheel coupling, and the semi-trailer has at least one electrically operated device, such as a support jack. A control device which is electrically connected to the fifth wheel coupling is disposed on the tractor, and a communications device which is wirelessly connected to the control device is disposed on the semi-trailer.

A fundamental drawback of the known system is that the parking brake is not applied to the semi-trailer after the supply lines are interrupted until a certain time interval has passed. One skilled in the art understands the terms "braking" and "application of the brake(s)" to mean actuation of the typically spring-loaded parking brake of the trailer immediately prior to de-coupling of the tractor from the trailer. For this process, the driver manually opens a ventilation valve which is in the braking circuit of the trailer, so that the brake circuit is shifted to an unpressured state, and the spring system in the spring-loaded brake causes the parking brake to engage. With an automatic plug coupling system, when the tractor is de-coupled from the trailer the plug halves of the tractor-side supply circuit and the trailer-side brake circuit are automatically separated, and thereby the brake circuit is necessarily de-pressurized. However, with such an arrangement, there may be a time lag between the separation of the plug halves and the engagement of the parking brake. This carries the risk of relative movement of the trailer, or in some cases backward movement of both the tractor and trailer.

SUMMARY OF THE INVENTION

Accordingly, an underlying problem of the present invention was to devise a system for braking of a trailer wherein the risk of un-controlled vehicle movement at least of the trailer is minimized.

This problem is solved according to the invention with a system wherein a ventilation valve pressure-release valve which is remotely controllable from the tractor is disposed in the brake circuit. When the desired parking position of the trailer is reached, the driver can cause the trailer to be braked prior to the opening of the fifth wheel coupling and before the extension of the support jack (e.g. for a semi-trailer), without having to leave the tractor cab and to manually operate a corresponding valve on the trailer.

Advantageously, the ventilation valve is controlled by wireless means. It is possible, however, to provide a control line which runs via supply lines of the supply circuit which lines need to be coupled manually; or alternatively to integrate the control line into an automatic plug coupling system, because it is fundamental that the trailer should be de-coupled from the tractor and correspondingly the trailer-side brake circuit should be de-coupled from the supply circuit of the tractor only after the parking brakes have been applied. In contrast, when the trailer is applied to the tractor, there is first a mechanical coupling of the trailer to the tractor, followed by release of the parking brake of the trailer. The parking brake of the now-coupled trailer is released, by means of actuation from the cab of the tractor, by closing the ventilation valve in the brake circuit of the trailer. This results in pressure buildup in the braking system (parking brake system) of the trailer.

In principle it is possible to use another medium other than the customary compressed air to operate at least the brake system of the trailer. The energy to overcome the spring forces in the spring-loaded brake can be provided, e.g., from electric batteries. In this case, the ventilation valve would be a component suitable to switch the brake circuit of the trailer into an energy-less state.

It has also been found to be particularly advantageous if the ventilation valve is controlled from the cab of the tractor, by an operating switch. In this "first embodiment", the operating switch is shifted from the trailer to the tractor.

Preferably, the state of closure of the ventilation valve is queryable from the tractor. This reduces erroneous actions by the driver, because the driver is kept informed about the condition open or closed of the ventilation valve. Particularly advantageous is an embodiment wherein the ventilation valve sends out a signal.

Basically, the operating switch of the ventilation valve should be coupled with the support jack disposed on the trailer, such that the support jack can only be extended if the ventilation valve is open. It is also advantageous if a locking mechanism for the fifth wheel coupling, which mechanism is disposed on the tractor, can be released from its locked condition only if the ventilation valve is open.

Advantageously, the inventive system has an automated plug coupling system for connecting and separating the supply circuit and the braking circuit. For this purpose, the tractor may have a control device which carries plausibility testing of the input from the driver, and controls the ventilation valve. With such an arrangement, the underlying problem of the invention is solved particularly well, and it is nearly impossible for the driver to incorrectly operate the ventilation valve.

According to a particularly advantageous embodiment, the control device receives a signal from the parking brake of the tractor. Alternatively, or additionally, the control device may receive a signal from the ignition system of the tractor, or from the vehicle control system of the tractor.

Advantageously, the locking mechanism of the fifth wheel coupling is connected to the control device, and is remotely operable from the tractor. This provides a particularly comfortable means of coupling and de-coupling the trailer, because the driver can now also perform the opening and closing of the fifth wheel coupling from the tractor. The connection of the remotely operable locking mechanism to the control device serves to systematically prevent releasing of the locking mechanism when the ventilation valve of the trailer brake circuit is not open. Alternatively, it may happen that a semi-trailer may continue to rest on the fifth wheel coupling, and the friction between the fifth wheel coupling and the semi-trailer plate is greater than the rolling resistance of the semi-trailer. In this case, the semi-trailer will tend to be dragged along for a certain distance without being securely attached to the tractor. However, the control device serves to ensure that the ventilation valve is open prior to the release of the locking mechanism, so that in every case the parking brake of the trailer will be engaged, and the trailer will remain in a fixed position.

The control device may receive a signal from the ventilation valve and may use this to exert influence on the parking brake of the tractor. This provides an additional means of safety, because now it is only possible to separate the tractor from a trailer which is ready to be de-coupled if the parking brake of the trailer is engaged.

It may also be provided that the control device receives a signal from the ventilation valve and blocks or releases the locking mechanism of the fifth wheel coupling under the influence of said signal.

DETAILED DESCRIPTION OF THE INVENTION

Figure 1:
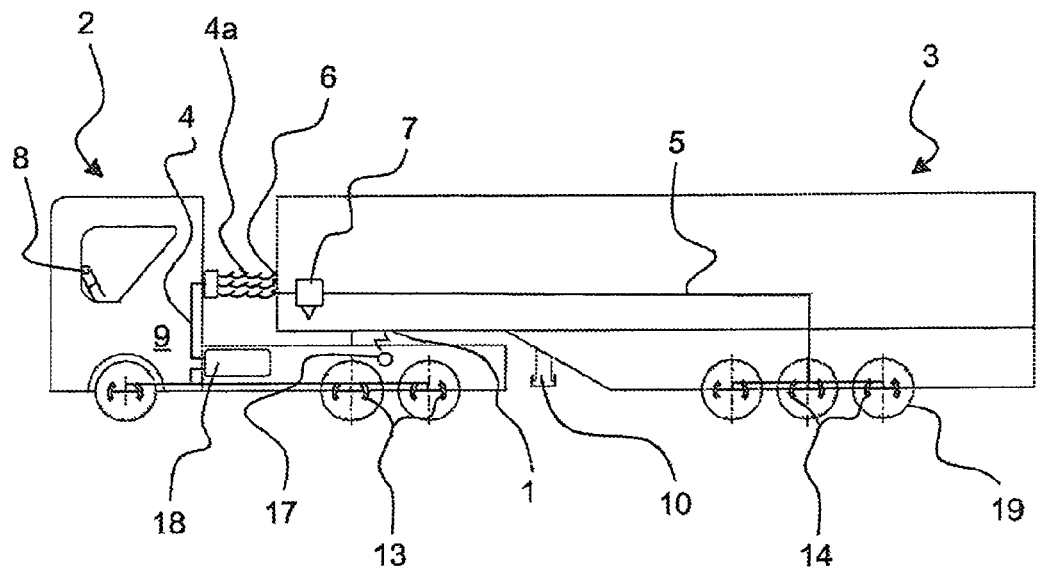
FIG. 1 is a schematic lateral view of the inventive system, applied to a tractor and trailer, with the use of plug-in supply lines.

FIG. 1 illustrates the inventive system applied to a tractor 2 having a semi-trailer 3 coupled to it, the tractor and trailer together comprising a tractor and semi-trailer combination. The trailer 3 is releasably coupled to the tractor 2 via a "fifth wheel" coupling 1.

The tractor 1 has a supply circuit 4 which supplies the trailer 3 with energy in the form of electricity and compressed air. In the rear region of the trailer 3, wheels 19 are provided which are acted upon by parking brakes, also known as automatic safety brakes, 14. The parking brakes 14 essentially comprise spring-loaded brakes having a spring complement whereby, in the absence of the tractor 2, a braking action is triggered. In order to move the trailer, compressed air is applied to the brake circuit 5 which is connected to the parking brakes 14, causing the spring complement to be dislodged from its locked position against the resistance of its spring force, thereby freeing the wheels 19.

The brake circuit 5 of the trailer is influenced by the supply circuit 4 of the trailer 2. The supply circuit is comprised of a compressed air reservoir 18 which is maintained at a specified pressure level by means of a compressor, not shown. The parking brakes 13 of the tractor 2 are supplied with compressed air from the compressed air reservoir 18.

According to the first embodiment, illustrated in FIG. 1, flexible supply lines 4a are connected to the supply circuit 4 at the rear side of the tractor housing 9. After the mechanical coupling of the tractor 2 and the trailer 3, the supply lines 4a are connected manually to the front side of the trailer 3 by means of plug couplings 6, whereby, among other things, compressed air is supplied to the brake circuit 5.

In order to relieve the pressure in the brake circuit 5 of the trailer 3 after the trailer has been placed in its desired parking position, thereby preventing the wheels 19 from rolling, a ventilation valve, pressure-release valve, 7 is disposed in the brake circuit 5 between the plug coupling and the parking brakes 14. This ventilation valve 7 of the brake circuit 5 is remotely controlled by an operating switch 8 in the cab 9 of the tractor 2. After the ventilation valve 7 is opened, the parking brakes 14 of the trailer 3 go into effect, and the driver can now extend the semi-trailer support jack 10 disposed in the front region of the trailer 3, and can release the locking mechanism 17 of the semi-trailer coupling, fifth wheel, 1.

Figure 2:
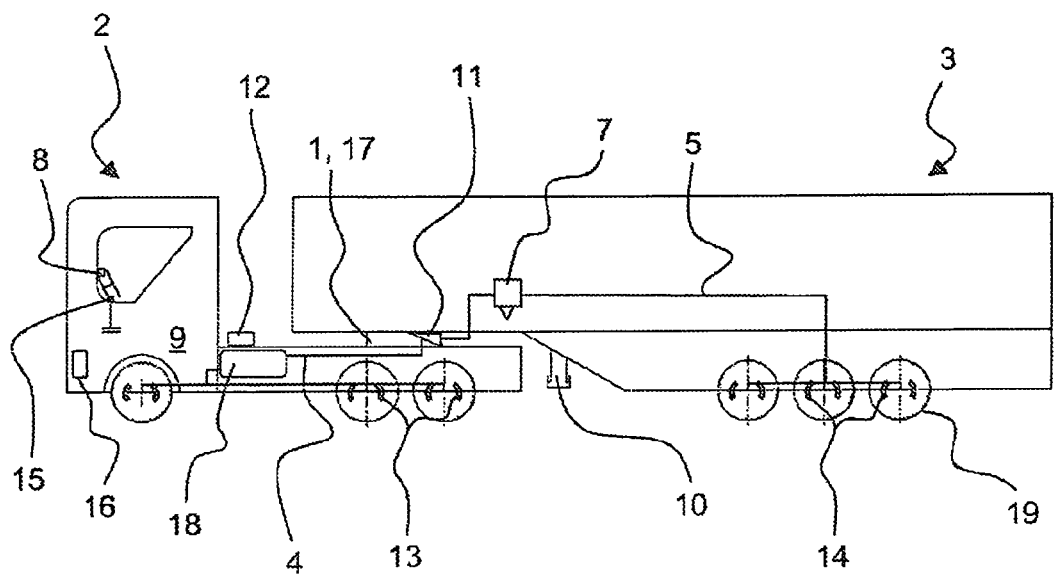
FIG. 2 is a view according to FIG. 1 with an automated plug-in coupling system for connection of the supply circuit and the braking circuit.

The embodiment of the invention according to FIG. 2 provides additional comfort and safety advantages. The brake circuit 5 of the trailer 3 is connected to the supply circuit 4 of the tractor 2 via a plug coupling system 11. The plug coupling system 11 is comprised of a plug half disposed on the trailer which engages a complementary plug half on the tractor 2 during or after the coupling of the trailer 3 in the region of the fifth wheel coupling 1.

The use of the plug coupling system 11 renders it unnecessary for the driver to climb into the narrow space between the cab 9 of the tractor 2 and the trailer 3. The supply lines 4a illustrated in FIG. 1 are completely eliminated when using the plug coupling system 11.

In this embodiment, a control device 12 is disposed on the tractor 2, which device exchanges wireless signals with the ventilation valve 7. The control device 12 also serves to control the plug coupling system 11 and the motor-driven support jack 10.

After the desired parking position of the trailer 3 is reached, the driver actuates the operating switch 8 which sends a signal to the control device 12. The control device 12 queries, preferably, the vehicle control system 16 and possibly also the state of the ignition system 15 and/or of the parking brake 13 of the tractor 2. Before the remote controlled locking mechanism 17 (see FIG. 1) is released, the tractor 2 must be definitely stopped via its parking brake 13. Then the control device 12 causes the ventilation valve 7 to open, so that the parking brake 14 of the trailer 3 is also applied. According to the invention, the actuation, opening, of the ventilation valve 7 causes the trailer to be stopped and held in a stopped condition.

In further steps, the control device 12 causes automatic extension of the support jack 10, followed by release of the locking mechanism 17.

Because the control device 12 is connected to the vehicle control system 16, when the ventilation valve 7 is not open, e.g., it will not be possible to advance the tractor 2 when the support jack is extended.

LIST OF REFERENCE NUMERALS

1 Fifth wheel coupling device.
2 Tractor (pulling vehicle).
3 Trailer (e.g. semi-trailer).
4 Supply circuit.
4a Supply lines.
5 Brake circuit.
6 Plug coupling.
7 Ventilation valve (pressure-release valve).
8 Operating switch.
9 Cab of the tractor.
10 Support jack.
11 Plug coupling system.
12 Control device.
13 Parking brake of the tractor.
14 Parking brakes of the trailer.
15 Ignition system of the tractor.
16 Tractor control system ("Vehicle control system").
17 Locking mechanism.
18 Compressed air reservoir of the tractor.
19 Wheels of the trailer.

What is claimed is:

1. A system for braking a trailer which is coupled to a tractor by a coupling device, comprising: a supply circuit on the tractor side and a brake circuit on the trailer side, wherein the brake circuit is removably coupled to the supply circuit by at least one plug-in coupling; wherein a ventilation valve or pressure-release valve which is remotely controllable from the tractor is disposed in the brake circuit.

2. The system according to claim 1; wherein the ventilation valve is controlled by wireless means.

3. The system according to claim 2, wherein the ventilation valve is controlled from a cab of the tractor by means of an operating switch.

4. The system according to claim 3, wherein the locking status of the ventilation valve is queryable from the tractor.

5. The system according to claim 4, wherein a support jack on the trailer and/or a locking mechanism of the fifth wheel coupling device is/are operatable and/or releasable only when the ventilation valve is open.

6. The system according to claim 1; wherein the ventilation valve is controlled from a cab of the tractor by an operating switch.

7. The system according to claim 1; wherein the locking status of the ventilation valve is queryable from the tractor.

8. The system according to claim 1; wherein a support jack on the trailer and/or a locking mechanism of the fifth wheel coupling device is/are operatable and/or releasable only when the ventilation valve is open.

9. The system according to claim 1, comprised of an automated plug coupling system for automatic connecting and disconnecting of the supply circuit and brake circuit; wherein the tractor has a control device which carries out plausibility testing of an input from a driver, and controls the ventilation valve.

10. The system according to claim 9; wherein the control device receives a signal from a parking brake of the tractor.

11. The system according to claim 10; wherein the control device receives a signal from the ventilation valve and exerts an influence on the parking brake of the tractor.

12. The system according to claim 9; wherein the control device receives a signal from an ignition system of the tractor.

13. The system according to claim 9; wherein the control device receives a signal from a vehicle control device.

14. The system according to claim 9; wherein a locking mechanism of the fifth wheel coupling device is connected to the control device and is remotely controllable from the tractor.

15. The system according to claim 14; wherein the control device receives a signal from the ventilation valve and blocks or releases the locking mechanism of the fifth wheel coupling device.

16. The system according to claim 9, wherein the control device receives a signal from an ignition system of the tractor.

17. The system according to claim 16, wherein the control device receives a signal from a vehicle control device.

18. The system according to claim 17, wherein a locking mechanism of the fifth wheel coupling device is connected to the control device and is remotely controllable from the tractor.

19. The system according to claim 18, wherein the control device receives a signal from the ventilation valve and exerts an influence on a parking brake of the tractor.

20. A system for braking a trailer which is coupled to a tractor by a coupling device, comprising:
a supply circuit on the tractor side and a brake circuit on the trailer side, wherein the brake circuit is removably coupled to the supply circuit by at least one plug-in coupling and wherein a ventilation valve or pressure-release valve, which is remotely controllable from the tractor, is disposed in the brake circuit to relieve the pressure in said brake circuit of the trailer after the trailer has been placed in its parking position thereby preventing wheels of the trailer from rolling.

* * * * *